Dec. 23, 1952     J. H. STEVENSON     2,622,838

VALVE

Filed Sept. 20, 1948

*INVENTOR.*
*JOHN H. STEVENSON*
BY
*ATTORNEY*

Patented Dec. 23, 1952

2,622,838

UNITED STATES PATENT OFFICE 2,622,838

VALVE

John H. Stevenson, Port Arthur, Tex.

Application September 20, 1948, Serial No. 50,039

2 Claims. (Cl. 251—31)

The invention concerns a valve which is actuated by a rising stem and which is adapted to regulate the flow of fluids thru pipe lines.

It is an object of the invention to provide a valve which is positive in operation and resistant to sticking, and which is adapted for use under relatively severe operating conditions.

It is also an object of the invention to provide a valve which is of simple, rugged construction and which requires a minimum of maintenance.

It is a further object of the invention to provide a valve in which the stem and the packing are fully enclosed and are protected against the action of the fluids being handled.

Another object of the invention is to provide a valve having relatively narrow seating surfaces and which may be readily disengaged from its seat.

A still further object of the invention is to provide a valve having means for lubricating its seating surfaces while it is in closed position to thereby minimize the tendency of the valve to stick.

Another object of the invention is to provide a valve having means for applying fluid pressure to the space between the valve and its seat to assist in unseating the valve.

Another object of the invention is to provide a valve having a plurality of outlets and which is adapted to simplify pipe connections by functioning also as an L or a T.

The invention will be understood by referring to the following description and the accompanying drawing, in which.

Figure 1:
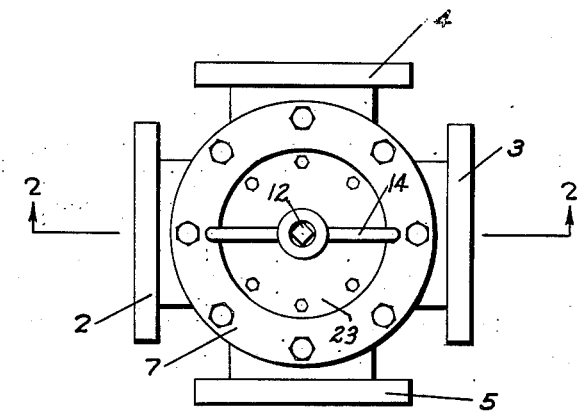
Fig. 1 is a top view of a valve embodying the invention.
Figure 2:
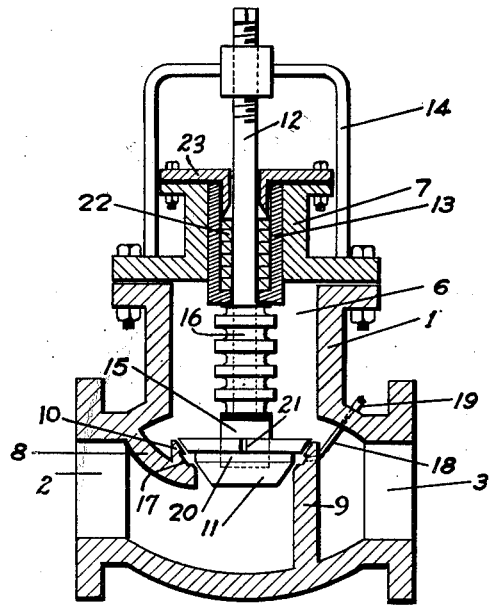
Fig. 2 is a sectional elevation taken on the line 2—2 of Fig. 1.

Referring to the drawing, a valve body 1 is provided with a side inlet 2 and a plurality of side outlets 3, 4 and 5. The outlet 3 is positioned opposite the inlet 2 while the outlets 4 and 5 are positioned at right angles to the inlet 2. When the valve is in use at least one of the outlets 3, 4 and 5 may be connected in a pipe line, the unused outlets being blinded off.

The valve body 1 extends upwardly above the inlet 2 and the outlets 3, 4 and 5, and an opening 6 is formed in the top thereof. A closure member 7 is adapted to be secured to the upper portion of the valve body 1 to close the opening 6.

An internal partition 8 forms a channel connecting the inlet 2 with the interior of an annular member 9 which is centrally located within the valve body 1 and extends upwardly from the bottom thereof.

A valve seat 10 is formed in the upper end of the annular member 9. The valve seat 10 is tapered and adapted to receive a valve 11, which likewise is tapered.

The valve 11 is secured to the lower end of a valve stem 12. The valve stem 12 extends upwardly thru a stuffing box 13, which is positioned in an opening formed in the closure member 7 and rigidly secured thereto. A yoke 14 is secured at its lower ends to the closure member 7 and is adapted to receive the upper end of the valve stem 12. The valve stem 12 and the yoke 14 are threaded, and the arrangement is such that when the valve stem 12 is rotated it is moved longitudinally by the action of the threads. The extreme upper end of the valve stem 12 is adapted to receive a wrench or a hand wheel (not shown).

A shoulder 15 is formed on the lower end of the valve stem 12, above the valve 11, and the lower end of the valve stem 12 is enclosed by a bellows 16. The bellows 16 surrounds the valve stem 12 and is positioned between the lower end of the stuffing box 13 and the shoulder 15. The bellows 16 is at all times partially compressed, so that a positive seal is maintained to protect the valve stem 12 and the interior of the stuffing box 13 against contact with the fluid being handled. A ground joint is formed between the upper end of the bellows 16 and the lower end of the stuffing box 13 in order to maintain a positive seal while permitting the valve stem 12 to be turned. The bellows 16 may be rigidly secured at its lower end to the shoulder 15. It is apparent that the same operative effect may be obtained by rigidly connecting the bellows 16 at one end to the closure assembly comprising the closure member 7 and stuffing box 13, while providing a ground joint at the free end of the bellows at its contact surface with the shoulder member 15.

An annular groove 17, which is formed about the periphery of the valve seat 10, divides the valve seat 10 into two relatively narrow, annular seating surfaces. The annular groove 17 provides a channel which is adapted to receive a lubricant or a hydraulic fluid which may be delivered thereto thru a conduit 18 and an external fitting 19. An annular groove 20, which is formed about the periphery of the valve 11, is adapted to receive lubricant or hydraulic fluid admitted to the annular groove 17 and to provide when the axis of the stem 12 extends vertically, a shoulder-like horizontally extending lifting surface on the under side of the valve 11 capable of being acted upon by fluid pressure to assist in unseating the valve 11. A vent 21 is provided for the escape of lubricant or hydraulic fluid when the valve 11 is seated.

Obviously, when the pressure fluid acts in unsealing the valve, the inherent play between the connection of the shoulder member 15 to the valve 11, and the inherent play between the threads of the stem 12 and the threads in the yoke 14, will allow a limited degree of vertical movement of the valve 11 which is affected by the lifting force of the pressure fluid alone.

The stuffing box 13 is filled with packing 22, which is retained therein by a packing gland 23. The packing gland 23 is secured to an upward extension of the closure member 7.

The invention may be modified in various ways without departing from the spirit and scope thereof.

I claim:

1. A valve comprising, a body having an inlet, an outlet, and an opening therein, a closure member for said opening, means providing an annular, tapered valve seat within said body between said inlet and said outlet, a valve providing a tapered seating surface receivable in said seat, a valve stem for said valve extending through an opening in said closure member, a stuffing box positioned in said closure member opening and adapted to receive said valve stem, means for advancing and retracting said valve stem longitudinally, a shoulder member connected to the inner end of said valve stem, a bellows surrounding said inner valve stem end and compressible between the inner end of said stuffing box and said shoulder and connected to said shoulder, a ground joint being formed between the outer end of said bellows and said inner stuffing box end to maintain a positive seal while said valve stem is turned, an annular groove being formed about the periphery of said valve seat to provide a horizontally extending surface when the axis of said valve stem extends vertically and dividing said valve seat into two relatively narrow, annular seat surfaces, a conduit extending through said body to said valve seat to communicate with said annular groove, and means connectable to the outer end of said conduit adapted to have a pressurized fluid insert therethrough to pass down said conduit to said groove to exert a lifting force against said surface tending to lift said valve.

2. A valve adapted to protect the stem against the effects of fluids being handled therein and comprising, a body having an inlet, an outlet, and an opening therein, a closure member for said opening, means providing an annular, tapered valve seat within said body between said inlet and said outlet, a valve providing a tapered seating surface receivable in said seat, a valve stem for said valve extending through an opening in said closure member, said closure member including a stuffing box positioned in said closure member opening and adapted to receive said valve stem therethrough, means for advancing and retracting said valve stem longitudinally, a shoulder member connected to the inner end of said valve stem, an annular groove being formed about the periphery of said valve seat to provide a substantially horizontally extending surface when the axis of said valve stem extends vertically and dividing said valve seat into two relatively narrow, annular seat surfaces, a conduit extending through said body to said valve seat to communicate with said annular groove, and means connectable to the outer end of said conduit adapted to have a pressurized fluid inserted therethrough to pass down said conduit to said groove to exert a lifting force against said surface tending to lift said valve, there being a bellows surrounding said inner valve stem end and compressible between the inner end of said closure assembly and said shoulder member, one end of said bellows being connected to the surface of the element in contact therewith and the other end being free and the end surface thereof and the surface of the element in contact therewith being adapted to form a ground joint to exclude the passage of said handled fluids into contact with said stem.

JOHN H. STEVENSON.

REFERENCES CITED

The following references are of record in the file of this patent:

UNITED STATES PATENTS

| Number | Name | Date |
| --- | --- | --- |
| 365,767 | Zilles | June 28, 1887 |
| 874,995 | Samuelson | Dec. 31, 1907 |
| 1,384,432 | Dempler | July 12, 1921 |
| 1,689,799 | Nordstrom | Oct. 30, 1928 |
| 1,716,992 | Varden | Jan. 11, 1929 |
| 1,983,855 | Jenkins | Dec. 11, 1934 |
| 1,992,902 | McIntosh | Feb. 26, 1935 |
| 2,304,491 | Allen | Dec. 8, 1942 |
| 2,394,012 | Rayburn | Feb. 5, 1946 |